No. 867,624. PATENTED OCT. 8, 1907.
H. J. WARTHEN.
SWITCH BOX.
APPLICATION FILED JULY 28, 1906.
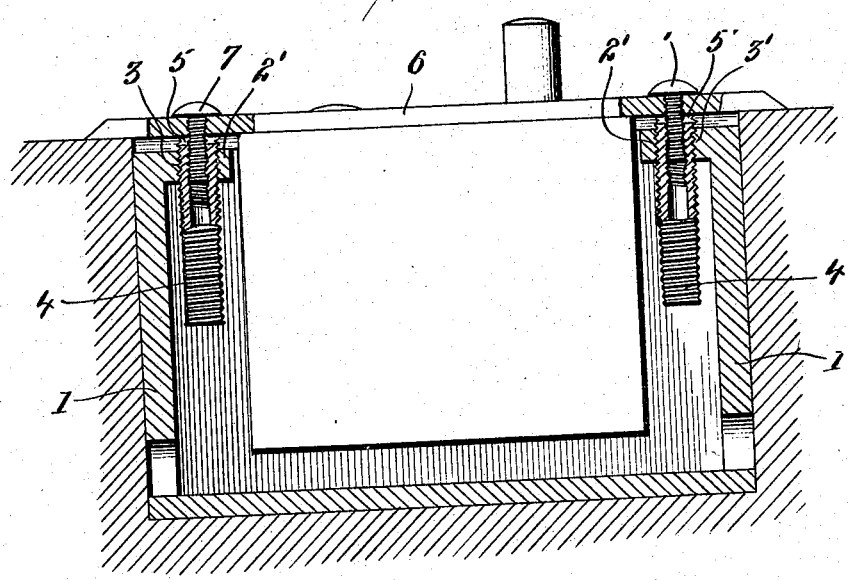
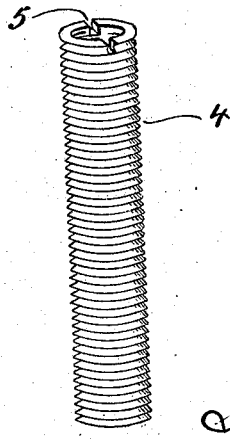
WITNESSES:
INVENTOR
Harry J. Warthen
BY Robert N. Young
Attorney

UNITED STATES PATENT OFFICE.

HARRY J. WARTHEN, OF WASHINGTON, DISTRICT OF COLUMBIA.

SWITCH-BOX.

No. 867,624.    Specification of Letters Patent.    Patented Oct. 8, 1907.

Application filed July 28, 1906. Serial No. 328,169.

*To all whom it may concern:*

Be it known that I, HARRY J. WARTHEN, a citizen of the United States, residing in Washington, in the District of Columbia, have invented a new and useful Improvement in Switch-Boxes, of which the following is a specification.

My invention relates to outlet boxes or switch boxes, and the object thereof is to produce an arrangement particularly adapted to be applied to outlet-boxes or switch boxes of standard design and make whereby the switch and wall plate may be readily adjusted laterally, that is in or out, to become flush with the surface and plane of the wall.

Another object of my invention is to provide a more simple and effective mechanism to accomplish the above results without affecting the usual design and style of wall boxes and switches now used and manufactured.

To this end the invention includes the combinations and arrangement of component parts to be hereinafter described and particularly pointed out in the claims.

In the accompanying drawings, Figure 1 is a vertical sectional view of a switch box and switch showing my invention, and Fig. 2 is a perspective view of the adjustable sleeve detached.

The invention includes, generally, a wall box, such as a switch box or an outlet box, adapted to be secured within a wall, a switch mechanism adapted to be secured within said box, and internally and externally screw-threaded sleeves carried on the box and adapted to be adjusted laterally thereon and to which the switch mechanism and wall plate is secured.

Referring to the accompanying drawings, 1 designates a wall box, shown herein as a conventional switch box of the usual construction and design adapted to be secured within the walls of buildings. Said box is provided with ears 2 and 2' on its upper and lower walls, which are suitably tapped at 3 and 3' to accommodate screws.

Prior to this invention, it has been the practice to secure the switch mechanism and wall plate within the box by screwing same to the box 1, the wall plate being provided with orifices registering with the taps 3 and 3' therein. In order to adjust the wall plate thus secured to become flush and parallel with the wall, and at the same time secure the plate against displacement, a number of washers or gaskets were carried on the screws and interposed between the plate and the bearing face of the wall of the box. Such method of adjustment is obviously slow and unsatisfactory, and to overcome this difficulty and accomplish a quicker and finer adjustment, I provide internally and externally screw-threaded sleeves 4 and 4' carried in the screw-threaded taps 3 and 3' in the box 1. Said sleeves have grooves 5 and 5' in their outer ends to accommodate a screw driver. In attaching the switch mechanism and wall plate, the said sleeves may be readily adjusted inwardly and outwardly from the wall until the plate 6 is flush therewith, when it is secured by screws 7 and 7' carried in the bore of the sleeves 4 and 4'.

The construction and operation of this invention will be readily understood upon reference to the foregoing description and the accompanying drawing, and it will be appreciated that the parts and combinations recited may be varied within a wide range and applied to other devices of analogous nature without departing from the spirit and scope of the invention.

Having thus described my invention, what I claim as new and desire to be secured by Letters Patent, is—

1. An article of the class described comprising a wall box carrying internally and externally screw-threaded sleeves adapted to be adjusted inwardly and outwardly, and a wall plate secured to said sleeves, substantially as described.

2. An article of the class described comprising a wall box, adjustable sleeves carried thereon, and a wall plate adapted to close said box secured to said sleeves, substantially as described.

3. An article of the class described comprising a wall box adapted to contain switch mechanism, internally and externally screw-threaded sleeves adapted to be adjusted inwardly and outwardly, carried on said box, a wall plate closing said box secured upon said sleeves by screws, substantially as described.

In testimony whereof I have signed my name to this specification in the presence of two subscribing witnesses.

HARRY J. WARTHEN.

Witnesses:
GEO. L. FISHER,
W. B. APPLEBY.